United States Patent [19]

Notardonato et al.

[11] 4,352,679

[45] Oct. 5, 1982

[54] DEOXYGENATING EQUIPMENT AND METHOD OF OPERATION

[75] Inventors: Luigi Notardonato, Park Ridge; Casimir Pulawski, Chicago; David M. Kemp, Naperville, all of Ill.

[73] Assignee: FMC Corporation, Chicago, Ill.

[21] Appl. No.: 252,871

[22] Filed: Apr. 10, 1981

[51] Int. Cl.³ .................................... B01D 19/00
[52] U.S. Cl. ...................................... 55/38; 55/44; 55/53; 55/55; 426/475; 426/477
[58] Field of Search ............... 55/38, 39, 52, 53, 166, 55/169, 186, 189, 193, 196, 198, 240, 342, 343, 48, 55; 99/275-277, 277.1, 277.2, 323.1, 323.2; 202/158; 261/113, 114 R, 114 JP, DIG. 7; 426/475, 477, 590

[56] References Cited

U.S. PATENT DOCUMENTS

| | | | |
|---|---|---|---|
| 1,066,153 | 7/1913 | Rueff | 426/477 |
| 1,418,457 | 6/1922 | Owen | 426/475 |
| 2,041,059 | 5/1936 | French | 55/55 X |
| 2,252,313 | 8/1941 | Bostock | 55/193 X |
| 2,870,016 | 1/1959 | Day et al. | 426/477 |
| 3,741,552 | 6/1973 | Skoli et al. | 55/159 X |
| 3,960,066 | 6/1976 | LaRocco et al. | 426/590 X |
| 4,112,828 | 9/1978 | Mojonnier et al. | 426/477 X |
| 4,216,711 | 8/1980 | Skoli et al. | 426/477 X |
| 4,259,360 | 3/1981 | Venetucci et al. | 55/53 X |
| 4,265,167 | 5/1981 | Mojonnier et al. | 426/477 X |

Primary Examiner—Robert H. Spitzer
Attorney, Agent, or Firm—Trexler, Bushnell & Wolters, Ltd.

[57] ABSTRACT

A method of simultaneously completely deoxygenating and partially carbonating a supply of water is disclosed. The method includes the steps of receiving and metering a flow of water, injecting at a positive pressure a first flow of carbon dioxide gas into the metered, flowing water, introducing the flow of metered, carbonated water into a vessel, maintaining the pressure within the vessel at less than one atmosphere, and drawing off the deoxygenated, carbonated flow of water. Equipment for performing this process is also disclosed. The equipment includes a metering device, deoxygenating column vessels, and devices for injecting the carbon dioxide gas into the water as the water flows from the metering device to the deoxygenating vessels.

7 Claims, 2 Drawing Figures

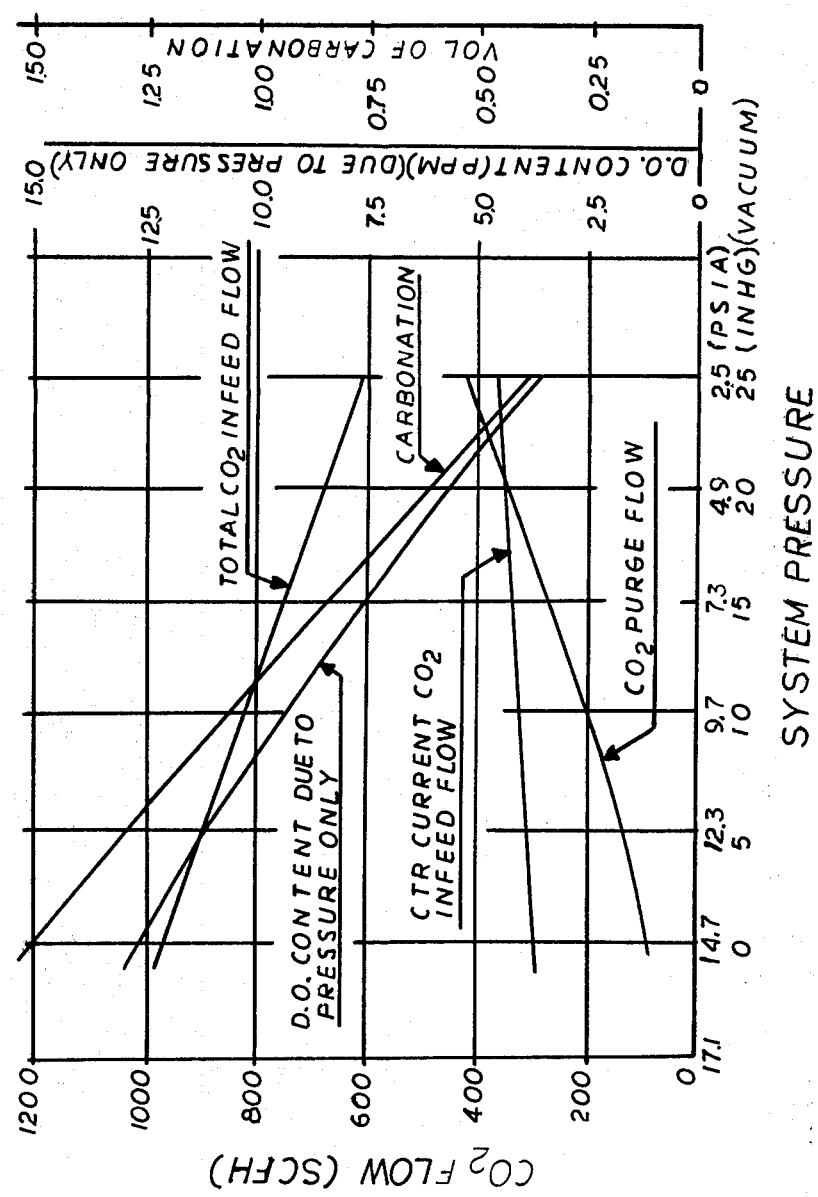

DEOXYGENATING EQUIPMENT AND METHOD OF OPERATION

BACKGROUND OF THE INVENTION

This invention relates generally to equipment for deoxygenating water, and methods of operating such equipment. More particularly, the invention concerns a method and apparatus for preparing deoxygenated water for use in beverages such as beer.

In at least some modern brewing operations, beer is prepared by combining deoxygenated water with a beer concentrate, sometimes called bright beer. The water feed stock must be almost perfectly or completely deoxygenated; the presence of even a small fraction of one part of air in one million parts of water can result in an unacceptable end product.

It is also desirable to provide a deoxygenated feed water stock which carries dissolved carbon dioxide gas. Water feed stocks containing relatively small amounts (less than 1.0 volumes) of carbon dioxide gas are particularly desirable for making a lightly carbonated beer; these lightly carbonated beers have proved commercially popular in Europe, Jamaica and elsewhere.

In the past, the preparation of these feed water stocks have involved heating the incoming water supply to, say, 140° fahrenheit; exposing the heated water to a high or almost perfect vacuum so as to extract oxygen gases; and then cooling the water. Thereafter, carbon dioxide in the required amount is added to the water. This process is onorous and time-consuming, and the equipment for performing the process is expensive. The requisite equipment requires large amounts of production floor space, and the fuel or energy costs are high.

Accordingly, it is the general object of the present invention to provide equipment and methods for producing almost perfectly deoxygenated water at low cost.

A more specific object is to provide equipment and method of producing virtually completely deoxygenated water without heating and subsequently cooling or recooling the water. A related object is to produce such equipment which will successfully operate on water at a temperature between 34° fahrenheit and ambient.

Another object is to provide equipment and methods of treating water which not only deoxygenates the water but which adds carbon dioxide in useful amounts to the water. More specifically, it is an object to produce deoxygenated water containing less than 1.0 dissolved volumes of carbon dioxide without using holding tanks, carbonating stones or the like.

A related object is to provide such equipment and methods which can be used directly in the production of low-carbonated beverages such as beer.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 2 is a graph showing performance of the equipment when the equipment is operated in accordance with the present invention.

DETAILED DESCRIPTION

Figure 1:
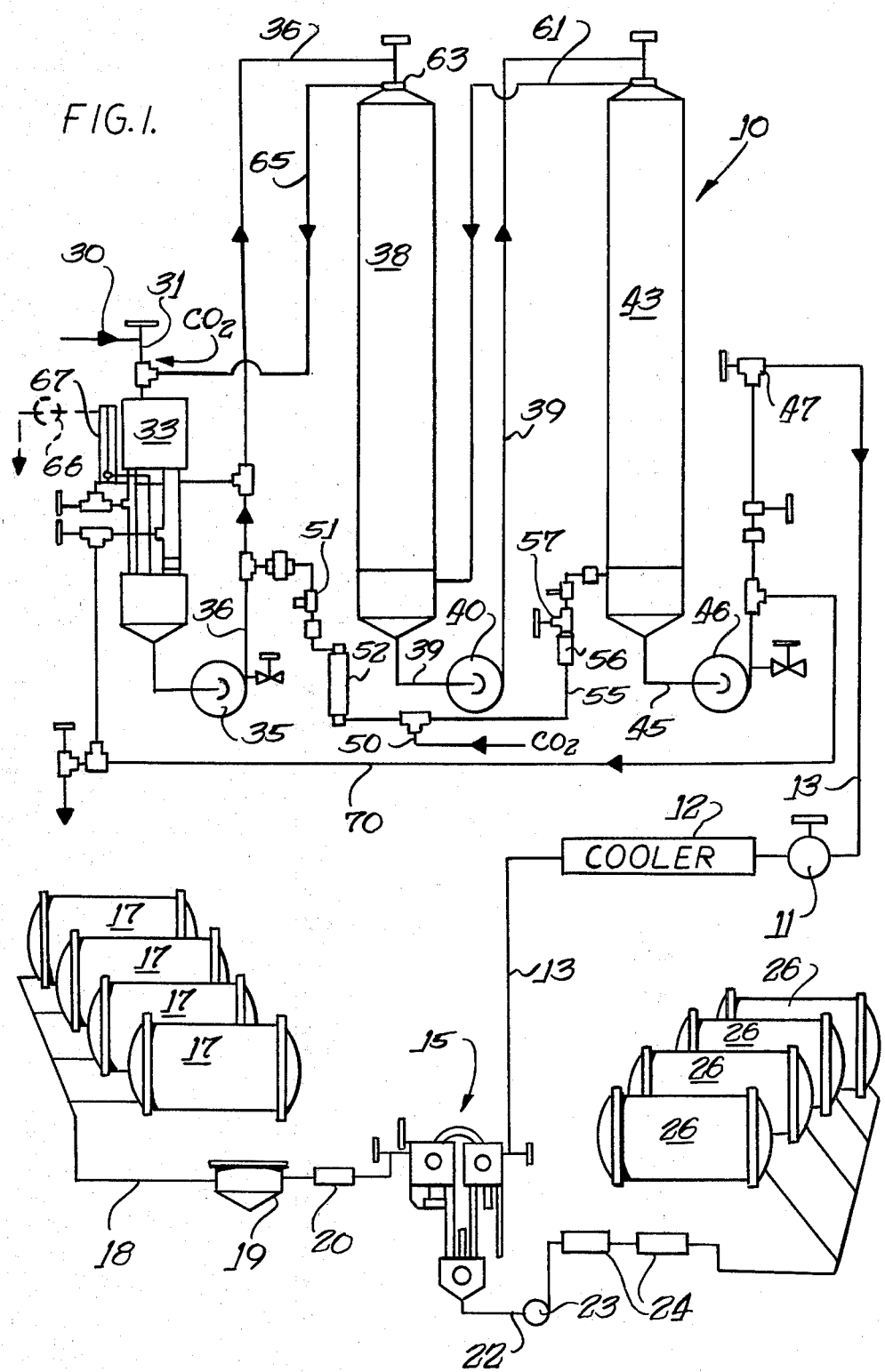
FIG. 1 is a schematic drawing showing deoxygenating equipment as it appears when used in a system for producing beer.

While the invention will be described in connection with a preferred embodiment and procedure, it will be understood that it is not intended to limit the invention to this embodiment or procedure. On the contrary, it is intended to cover all alternatives, modifications and equivalents as may be included within the spirit and scope of the invention as defined by the appended claims.

Turning first to FIG. 1, there is shown a system for producing beer which can be operated in accordance with the present invention. In general, a water feed stock is deoxygenated and simultaneously lightly carbonated by deoxygenating equipment 10. The deoxygenated water is routed through appropriate valving 11 and a cooler 12 along piping 13 to a proportioner and mixing device 15. This proportioner equipment can be of the "fixed head over orifice" sort described and claimed in Witt et al. U.S. Pat. No. 3,237,808, or other known types.

Beer concentrate, often called high-gravity beer or "dark beer," is drawn from tanks 17 through a piping arrangement 18 to a polish filter 19 and a quantity-measuring device 20, and is then routed to the proportioner 15. Here in the proportioner 15, the dark beer is mixed with the water.

The beverage product is drawn off through piping 22 through appropriate pumps 23 and cooling and measuring devices 24. The resulting beverage product can be stored in appropriate downstream tanks 26 or routed to other appropriate equipment (not shown).

The deoxygenating and carbonating equipment 10 receives a supply of feed water from a remote source (not shown) through an intake line 30. This water is directed by an appropriate valving and piping arrangement 31 to a mechanical metering device 33. It will be understood that this metering device is set to carefully regulate the rate of flow of water through downstream portions of the deoxygenating equipment and system and to deliver that water at a pre-set rate of flow. This mechanical metering device can be constructed in accordance with the "fixed head over orifice" principles set out in Witt et al. U.S. Pat. No. 3,237,808, or in accordance with other known arrangements.

The metered water flow is sent, by an appropriate pump 35 and piping 36, to the top of a deoxygenating vessel or column 38. This deoxygenating unit is disclosed in U.S. Pat. No. 4,216,711 issued Aug. 12, 1980; in U.S. application Ser. No. 050,158 filed June 20, 1979; and in U.S. application Ser. No. 206,455 filed Nov. 13, 1980. Water is collected at the bottom of this vessel 38 and is routed, by piping 39 and an appropriate pump device 40, to downstream portions of the system.

If desired, further deoxygenating effect can be obtained by including one or more additional deoxygenating column vessels 43. In this case, the water is again routed by the piping 39 to the top of this second or subsequent deoxygenating vessel 43. Again, treated water is drawn, by piping 45 and an appropriate pump 46, through valving 47 to the transport line 13 for movement to the proportioner structure 15. In accordance with the invention, a first flow of carbon dioxide gas is injected at a positive pressure into the metered, flowing water. Here, this is accomplished by routing a first flow of the incoming carbon dioxide gas from an inlet 50 through appropriate valving devices 51 and metering mechanisms 52, so as to inject that gas at a positive pressure directly into the water line 36 in a concurrent flow leading to the deoxygenating vessel 38. The flow of pressurized, metered, carbonated water is thereafter introduced into the deoxygenating vessel 38.

In further accordance with the invention, the pressure within the vessel 38, which is experienced by the metered, carbonated water, is maintained within a range of about 14.7 pounds per square inch absolute and about 4.9 pounds per square inch absolute. That is, a partial but definite vacuum is maintained by means of a vacuum-producing device 66 within the deoxygenating vessel 38 and the water is subjected to deoxygenating and carbonating action in this vacuum.

In the illustrated embodiment, the water is then directed to a subsequent or second deoxygenating vessel 43. A second flow of carbon dioxide gas is delivered from the inlet 50, via piping 55, metering mechanisms 56 and valving 57, to the interior of the second or subsequent deoxygenating vessel 43, as well. Here, too, the vessel interior is maintained at a pressure of between about 14.7 pounds per square inch absolute and about 4.9 pounds per square inch absolute while further deoxygenation and carbonation occurs.

It will be understood that a vacuum is commonly used to remove oxygen from water. In the present invention, however, the vacuum is not provided to remove oxygen. Rather, the vacuum is provided solely to insure that the cold, treated water will contain less than one dissolved volume of carbon dioxide.

In carrying out the invention, it will be noted that water is delivered by the piping 39 to the top of the second deoxygenating vessel 43, and that carbon dioxide is delivered to the vessel 43 at a point generally near the vessel bottom. It will be understood that this second flow of carbon dioxide gas moves through the vessel 43 in a direction counterflow to the path of movement of the water, as generally described in the patent and patent applications specified above. Structure within the vessel 43 causes the second flow of carbon dioxide gas to intimately contact the water flow in the vessel.

The small amount of the removed oxygen and the excess carbon dioxide gas is taken from the vessel 43 near the vessel top by a line 61 so as to maintain pressure inside the vessel within that range of about 14.7 pounds per square inch absolute to about 4.9 pounds per square inch absolute. This excess carbon dioxide gas is routed by the line 61 to the bottom of the upstream deoxygenating vessel 38. Again, the carbon dioxide gas is injected into the deoxygenating vessel 38 near the vessel bottom, while water is introduced into the vessel near the vessel top. Again, a counterflow of water and gas occurs, and intimate mixing results. Again, the excess carbon dioxide gas and liberated oxygen is removed through an appropriate transfer line 65. In this way, a carbon dioxide atmosphere is provided within the metering device 33, and some oxygen is removed from the water during metering activity. The carbon dioxide gas and any removed oxygen or other gaseous materials are finally removed from the system through an appropriate exhaust structures 66 and 67.

It is a feature of the invention that it is unnecessary to heat and then subsequently cool the water during this deoxygenating and carbonating treatment. Experience has shown that surprisingly good results are obtained with water in the system at a temperature as low as 34°-37° fahrenheit.

If desired, the deoxygenated, lightly carbonated water can be routed by a return line 70 from the output pump 46 back to the mechanical metering device 33. In this way, water within the system can be effectively recirculated, yet it is maintained in its deoxygenated, carbonated condition.

Performance of this equipment in accordance with the invention is indicated in FIG. 2. Generally speaking, as the negative pressure or vacuum within the deoxygenating vessels increases, the demand for countercurrent carbon dioxide infeed flow increases, but the increase in demand is relatively slight. This slight increase is more than offset by the decrease in carbon dioxide demand at the water injector mechanisms, 52, 51, so that the total infeed flow of carbon dioxide actually decreases as the negative pressure or partial vacuum within the vessels 38 and 43 increases. As the vacuum is increased within the vessels, the outflow or purge flow of carbon dioxide gas increases.

It will be noted that, in accordance with the invention, the amount of carbonation within the finally treated water decreases as vacuum or negative pressure within the vessels is increased. Moreover, the dissolved oxygen content within that water, due to pressure only, decreases greatly.

The invention is claimed as follows:

1. A method of simultaneously deoxygenating and carbonating a supply of water, comprising the steps of receiving a flow of water from a source, metering the rate of flow of water, then injecting at a positive pressure a first flow of carbon dioxide gas into the metered, flowing water, thereafter introducing said flowing, carbonated water into a vessel, maintaining the pressure within the vessel and experienced by the metered, carbonated water at between about 14.7 and 4.9 pounds per square inch absolute, thereafter introducing a second flow of carbon dioxide gas into said vessel in counterflow to said water therein, removing excess carbon dioxide from said vessel at the upstream side of the vessel to maintain said pressure, introducing said excess carbon dioxide into the flowing water upstream from said vessel and thereafter cooling said flow to a 34°-37° F. temperature, so as to remove oxygen from the water and leave the cooled carbonated water discharged from said vessel with less than 1.0 dissolved volumes of carbon dioxide, and thereafter drawing off the deoxygenated, carbonated flow of water.

2. A method according to claim 1 wherein said step of metering said flow of water is performed in a mechanical metering device.

3. A method according to claim 2 including the step of introducing a flow of carbon dioxide gas at a positive pressure into said mechanical metering device.

4. A method according to claim 2 including the step of purging carbon dioxide gas and any oxygen from the mechanical metering device.

5. A method according to claim 2 including the step of transfering said carbon dioxide gas from said deoxygenating vessel to said mechanical metering device.

6. A method according to claim 1 in which said metering is performed in a mechanical metering device and including the step of re-introducing deoxygenated, carbonated water into said mechanical metering device, and transferring the water from the mechanical metering device back into the deoxygenating vessel so as to effectively hold said water and maintain said water in its deoxygenated, carbonated condition.

7. A method according to claim 1 including the step of re-introducing deoxygenated, carbonated water into said deoxygenated vessel so as to effectively hold said water and maintain said water in its deoxygenated, carbonated condition.

* * * * *